(12) United States Patent
Raber et al.

(10) Patent No.: US 12,365,232 B2
(45) Date of Patent: Jul. 22, 2025

(54) MAGNETIC CLUTCH WITH AN AXIS OF ROTATION FOR ACTUATING A DISCONNECT CLUTCH

(71) Applicant: Schaeffler Technologies AG & Co. KG, Herzogenaurach (DE)

(72) Inventors: Christoph Raber, Ottweiler-Steinbach (DE); Marc Finkenzeller, Gengenbach (DE); Patrick Huber, Oberkirch (DE); Jens Bohnen, Wolfach (DE); Dominic Melischko, Herrlisheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 555 days.

(21) Appl. No.: 17/774,156

(22) PCT Filed: Oct. 28, 2020

(86) PCT No.: PCT/DE2020/100921
§ 371 (c)(1),
(2) Date: May 4, 2022

(87) PCT Pub. No.: WO2021/104560
PCT Pub. Date: Jun. 3, 2021

(65) Prior Publication Data
US 2022/0371428 A1 Nov. 24, 2022

(30) Foreign Application Priority Data
Nov. 28, 2019 (DE) ............ 10 2019 132 229.4

(51) Int. Cl.
*F16D 27/115* (2006.01)
*B60K 6/387* (2007.10)
(Continued)

(52) U.S. Cl.
CPC ............ *B60K 6/387* (2013.01); *F16D 13/52* (2013.01); *F16D 23/12* (2013.01); *F16D 27/115* (2013.01);
(Continued)

(58) Field of Classification Search
CPC ....... F16D 27/00–115; F16D 2023/123; F16D 67/02; F16D 63/002
See application file for complete search history.

(56) References Cited

U.S. PATENT DOCUMENTS

| 11,111,971 B2* | 9/2021 | Finkenzeller ............ F16D 13/52 |
| 2013/0015033 A1* | 1/2013 | Pardee ................... F16D 27/112 192/84.1 |
| 2019/0128339 A1* | 5/2019 | Finkenzeller ......... F16D 27/004 |

FOREIGN PATENT DOCUMENTS

| CN | 101761591 A | 6/2010 |
| CN | 103047314 A | 4/2013 |

(Continued)

OTHER PUBLICATIONS

Author: Eckenfels, Thomas, 48v Hybrid Module, Development E / E in the Powertrain, pp. 64-71, Feb. 1, 2016 Germany, www.ATZelektronik-worldwide.com.

*Primary Examiner* — Ernesto A Suarez
*Assistant Examiner* — Lillian T Nguyen

(57) ABSTRACT

A magnetic clutch for actuating a disconnect clutch includes an axis of rotation, an axially fixed stator, an axially movable armature, a torque-axial force converter unit with an armature side and a bearing side, and a rotary brake. The axially movable armature is axially retainable on the stator by a magnetic force from a power supply. The torque-axial force converter unit acts in an antagonistic manner to the magnetic force to hold the armature at an axial distance from the stator. The rotary brake is for effecting a rotational speed difference between the armature side and the bearing side. Other aspects of the disclosure include a disconnect clutch for an internal combustion engine in a hybrid drive train, a hybrid drive train, and a method for controlled closing of the disconnect clutch.

15 Claims, 6 Drawing Sheets

(51) Int. Cl.
   *F16D 13/52*   (2006.01)
   *F16D 23/12*   (2006.01)
   *F16D 48/06*   (2006.01)

(52) U.S. Cl.
   CPC .......... *F16D 48/06* (2013.01); *B60Y 2200/92* (2013.01); *F16D 2023/123* (2013.01)

(56) References Cited

FOREIGN PATENT DOCUMENTS

| | | | | |
|---|---|---|---|---|
| CN | 107196480 | A | 9/2017 | |
| CN | 108223219 | A | 6/2018 | |
| CN | 110177956 | A | 8/2019 | |
| DE | 102013213144 | A1 * | 1/2015 | ............. F16D 27/08 |
| DE | 102014216345 | A1 | 2/2016 | |
| DE | 102015209791 | B3 | 8/2016 | |
| DE | 102016206675 | A1 | 10/2017 | |
| DE | 102018131753 | A1 * | 6/2020 | |
| JP | S58146723 | A | 9/1983 | |
| JP | H06328950 | A | 11/1994 | |
| JP | 3373459 | B2 | 2/2003 | |
| JP | 4876795 | B2 | 2/2012 | |
| JP | 2019048527 | A | 3/2019 | |
| KR | 101028014 | B1 | 4/2011 | |
| KR | 20160060048 | A | 5/2016 | |
| KR | 20160099566 | A | 8/2016 | |
| KR | 20190057290 | A | 5/2019 | |

\* cited by examiner

MAGNETIC CLUTCH WITH AN AXIS OF ROTATION FOR ACTUATING A DISCONNECT CLUTCH

CROSS-REFERENCE TO RELATED APPLICATIONS

This application is the United States National Phase of PCT Appln. No. PCT/DE2020/100921 filed Oct. 28, 2020, which claims priority to German Application No. DE102019132229.4 filed Nov. 28, 2019, the entire disclosures of which are incorporated by reference herein.

TECHNICAL FIELD

The present disclosure relates to a magnetic clutch with an axis of rotation for actuating a disconnect clutch, a disconnect clutch with such a magnetic clutch for an internal combustion engine in a hybrid drive train, a hybrid drive train with such a disconnect clutch, a motor vehicle with such a hybrid drive train, as well as a closing method for the controlled closing of a disconnect clutch.

BACKGROUND

With the increasing electrification of drive trains, for example in the field of hybrid motor vehicles, purely electric driving is required as the main state for inner-city speeds (for example up to 50 km/h [fifty kilometers per hour]). The electric driving functions of creeping, maneuvering and active gliding, i.e., maintaining a current vehicle speed, can be implemented even with a lower output of the electric drive machine. When the supply voltage is low, the system can only be used in part to a limited extent for acceleration processes and starting processes. The engine restart of the internal combustion engine via the electric drive machine can be presented very dynamically and conveniently and is therefore significantly improved relative to a conventional start-stop system. There is a restriction when driving electrically with simultaneous engine restart in the case of low output from the electric drive machine. There is a conflict of objectives between the torque distribution for traction (in the direction of the output) and the restart (in the direction of the internal combustion engine). The requirements for the disconnect clutch system and any additional starting system that may be required therefore follow on the basis of the selected operating strategy.

A disconnect clutch is provided for restarting the internal combustion engine, which is often referred to as K0 clutch. With respect to its adjustability and its functional values, such a K0 clutch has to meet different requirements than previously known starting clutches, for example in a pure internal combustion engine drive train. In this context, a clutch system has already been devised which uses a magnetic clutch as a pilot clutch. Such a disconnect clutch is published in ATZelektronik, edition February 2016, page 64 and subsequently in the article "48-V-Hybridmodule Mehr als ein Einstieg in die Elektrifizierung" under the heading "Entwicklung E/E im Antriebsstrang".

The disadvantage of this concept is that the magnetic clutch has to be designed with an axial gap between the armature plate (armature) and the rotary transducer (stator) on the internal combustion engine side, which is necessary for releasing the pilot clutch from a drag torque. Due to the square force decrease with the magnetic travel, the axial gap must be kept with a very small axial expansion.

SUMMARY

The disclosure relates to a magnetic clutch having an axis of rotation for actuating a disconnect clutch, having at least the following components:
- an axially fixed stator;
- an axially movable armature, wherein the armature can be held axially on the stator by means of a magnetic force as a result of a power supply; and
- a torque/axial force converter with an armature side and with a bearing side acting antagonistically to the magnetic force, by means of which the armature is kept axially spaced from the stator.

The magnetic clutch may include a rotary brake, by means of which a speed difference is achieved between the armature side and the bearing side of the torque/axial force converter.

In the following, reference is made to the stated axis of rotation when the axial direction, radial direction or the circumferential direction and corresponding terms are used, unless explicitly stated otherwise. Unless explicitly stated otherwise, ordinal numbers used in the preceding and subsequent description are used only for the purposes of clear distinction and do not indicate an order or the order of designated components. An ordinal number greater than one does not necessarily mean that another such component must be present.

The magnetic clutch proposed here is configured as a pilot clutch for a disconnect clutch, e.g., for a hybrid drive train, for example for a motor vehicle. By means of the magnetic clutch, a pilot torque can be generated in a manner switchable into an axial actuation force, for example a pressing force, for a main clutch, such that a torque to be transmitted for the hybrid drive train can be transmitted (at least mainly) via the main clutch. The main clutch is, for example, a conventional friction clutch or a so-called wedge clutch (form-fit clutch that can be operated with slippage in a low differential speed range).

The magnetic clutch can be rotated about an axis of rotation, the stator and the armature rotating with the applied speed when the disconnect clutch is closed. The stator is axially fixed and, in the case of a corresponding power supply, causes an axial magnetic force on the armature, such that the armature is held by said magnetic force against the axially fixed stator. The stator may be designed with a coil and the armature is designed as a passive, for example ferromagnetic, element. Furthermore, there is a torque/axial force converter provided, for example including at least one leaf spring, helical spring and/or a ramp, which is arranged to counteract the magnetic force (e.g., in a biased manner). By means of the torque/axial force converter, the armature is kept at a distance from the stator with a desired axial gap, for example in order to keep the magnetic clutch free of drag torque.

The torque/axial force converter has an armature side which is associated with the armature and is connected directly or indirectly to the armature. Axially opposite, the torque/axial force converter has a bearing side, which is associated with the electric drive machine when used, for example, in a hybrid drive train. The bearing side thus rotates with the electric drive machine (or its rotor) and the armature side with the internal combustion engine (or its internal combustion engine shaft). When the disconnect clutch and/or the magnetic clutch is closed, the armature side and the bearing side run synchronously.

It is now proposed here that a rotary brake is additionally provided, the brake being configured to bring about a differential speed between the armature side and the bearing side of the torque/axial force converter by means of braking action, i.e., a relative speed above the torque/axial force converter. The rotary brake is fixed against a rotational movement, e.g., fixed on a stationary housing, for example on the motor housing of the electric drive machine, on a clutch bell and/or on the engine block of the internal combustion engine. If the rotary brake is closed and a speed is applied to the bearing side and no speed is applied to the armature side, for example if a connected internal combustion engine shaft is still, a differential speed is brought about between the bearing side and the armature side, and, against the bias of the torque/axial force converter for keeping the axial gap between the armature and the stator, an axial movement which reduces the axial gap is imposed on the torque/axial force converter as a result of the differential speed. For example, with a torque/axial force converter designed as a compression spring, the torque/axial force converter is axially positioned as a result of the torsion caused by the differential speed.

In one embodiment of the torque/axial force converter as a tension spring, the torque/axial force converter is axially contracted as a result of the torsion. Thus, the axial gap can be reduced and enlarged in a controllable manner by means of the rotary brake, with no magnetic force being required for this, for example. Closing or at least reducing the axial gap by means of the rotary brake means no such high magnetic force is necessary to overcome the axial gap, for which in previously known solutions without a rotary brake a large magnetic force is necessary due to the quadratic dependence on the size of the axial gap, and thus the stator and armature can be designed with smaller dimensions and/or can be actuated with a lower power supply. For example, a magnetic force is sufficient which holds the armature axially on the stator when the axial gap is overcome (i.e., closed).

The axial gap may be axially longer than permissible for a purely magnetic closing or than a gap width over which a sufficient magnetic force can be generated. For example, the axial gap is greater than or equal to 1 mm [greater than or equal to one millimeter]. In an example embodiment, no or only a slight magnetic force is generated during the closing of the axial gap (by means of the brake), said magnetic force being so low that a torque can be gently built up via the main clutch from a minimum force to a maximum force (see below).

It is also proposed in an example embodiment of the magnetic clutch that the rotary brake comprises a looped belt, the looped belt being connectable directly to the armature in a frictional and torque-transmitting manner, for example.

In this embodiment, the rotary brake includes a looped belt, which may be wound once or several times around the armature-side component to be braked. The looped belt may be fixed at one end and an actuator, e.g., a linear motor, is provided at the other end, whereby, due to the cable pull effect (according to the Euler-Eytelwein formula) of the looped belt, only low adjusting forces are required for the actuator. This results in simple adjustability for the speed difference between the bearing side and the armature side of the torque/axial force converter and at the same time only a small amount of, e.g., electrical, energy is required to operate the actuator. In addition, the adjustability is faster than due to the magnetic force, which due to inertia (induction) can only be slowly reduced again. Closing of the axial gap can therefore be interrupted again in the process if a situation requires it (for example sudden braking from a requested rapid acceleration in a hybrid drive train of a motor vehicle).

As an alternative to simple switching electronics, the brake can be operated in a purely binary manner, i.e., between open (no braking torque) and closed (the maximum braking torque required to close the axial gap), with the closed state of the brake only being maintained for a predetermined maximum period of time and/or the power supply to the coil of the magnetic clutch triggering or switching in a triggerable manner, for example. Then, as described above, a closing process of the axial gap can also be interrupted in the process, but back to (completely) open.

In an example embodiment, the looped belt frictionally interacts directly with the armature so that the anchor itself is rotatably braked by means of the looped belt relative to the bearing side, for example a clutch cover that corotates (with the electric drive machine).

According to a further aspect, a disconnect clutch is proposed in a hybrid drive train for an internal combustion engine train, having at least the following components:
  a main clutch for separable transmission of a predetermined target torque;
  a magnetic clutch according to an embodiment as described above for controllably transmitting a pilot torque for the main clutch; and
  a ramp system for converting the pilot control torque into an axial actuation force, the main clutch being closable by means of the actuation force of the ramp system.

A disconnect clutch is now proposed here, which in a hybrid drive train is arranged between an internal combustion engine and an electric drive machine, for example arranged conventionally as a K0 clutch. For example, the disconnect clutch includes a corotating clutch cover, on which the drive rotor (rotor shaft) of an electric drive machine engages in a permanently torque-transmitting manner and a corresponding drive stator is arranged radially outside. Alternatively, such a corotating clutch cover is at the same time a traction pulley, for example for an electric drive machine arranged in parallel and connected in a torque-transmitting manner by means of a belt drive. In an alternative embodiment, the clutch cover is connected on the internal combustion engine side and a central shaft is connected to the electric drive machine.

The main clutch is configured to transmit a predetermined target torque according to the desired output of the internal combustion engine. For this purpose, the main clutch can be actuated by means of the magnetic clutch, which is configured as a pilot clutch. The pilot torque is transferred (at least in part) to the ramp system, where the pilot torque is converted into an axial actuation force by means of which the main clutch can be compressed sufficiently in order to transmit the predetermined target torque. At least when the maximum pilot torque is applied, the main clutch is then closed by means of the ramp system in such a way that the predetermined target torque can be transmitted.

The main clutch can be operated with slippage, e.g., designed as a friction clutch, so that the torque that can be transmitted from the electric drive machine to the internal combustion engine can be controlled. This slipping operation can be adjusted more easily in that the brake is provided for closing the axial gap between the armature and the stator of the magnetic clutch. It is therefore not necessary not to generate the (often maximum) magnetic force in order to close the axial gap, which magnetic force, due to inertia, cannot be reduced again sufficiently quickly immediately after the axial gap has been closed. Conventionally, this results in a high pilot torque and the main clutch is closed quickly, in some cases harshly.

However, if the magnetic force is only switched on after the axial gap has been reduced, e.g., after the axial gap has been completely closed, the magnetic force can be increased smoothly from a minimum force to a maximum force for transmitting the desired target torque. The minimum force is just sufficient, for example, to hold the armature on the stator of the magnetic clutch. This also means that (optionally) the axial gap can be reduced in an adjustable manner by means of braking torque and the main clutch can now be operated in an adjustable manner with slippage in that the magnetic clutch can be powered proportionate to the desired actuation force, for example pressing force, or to the engagement path.

It is also proposed in an example embodiment of the disconnect clutch that the main clutch includes a friction stack, which is designed according to one of the following configurations:

- as a plate stack, e.g., with the ramp system as a pressing means acting directly on the plate stack;
- as a multi-disk stack, e.g., with the ramp system as a pressing means acting directly on the multi-disk stack; and
- as a single-disk stack, e.g., with an actuating spring between the ramp system and the single-disk stack.

It is proposed here that the main clutch includes a friction stack, the friction stack being designed as a plate stack, that is with a plurality of input plates and antagonistic output plates, which may be suspended in a corresponding input cage or output cage. In an example embodiment, the ramp system acts as a pressing means, for example in accordance with a pressure plate, directly, for example with a ramp element on the friction stack side, on the plate stack. Alternatively, for example, a lever, for example a lever spring such as a diaphragm spring, and/or a tension pot or pressure pot is interposed.

In another embodiment, the friction stack is designed as a multi-disk stack, with at least one intermediate plate being provided, which is similar in function to a pressure plate, but is arranged between two friction disks and is provided with friction surfaces on both sides for this purpose. The intermediate disk can be moved axially like a pressure plate. In an example embodiment, the pressure plate of the multi-disk stack is formed directly by the ramp system, for example a ramp element on the friction stack side. Alternatively, a separate pressure plate and/or a lever, for example a lever spring such as a diaphragm spring, and/or a tension pot or pressure pot is interposed.

In another embodiment, the friction stack is designed as a single-disk stack, with an axially central friction disk being provided which can be pressed between a pressure plate and a counter-plate. In an example embodiment, an actuating spring, for example a diaphragm spring, is provided between the ramp system and the single-disk stack, e.g., acting directly on a pressure plate.

In an example embodiment, the disconnect clutch has a corotating clutch cover, and the plates (pressure plate, intermediate plate and/or counter-plate) of the friction stack, designed as a single-disk stack or multi-disk stack, are configured to corotate permanently with the corotating clutch cover. This means that the plates rotate with the electric drive machine at a speed applied to the rotor.

According to a further aspect, a hybrid drive train is proposed, including at least the following components:

- an internal combustion engine with an internal combustion engine shaft;
- an electric drive machine having a rotor shaft;
- a transmission for torque-transmitting connection of the internal combustion engine shaft and/or the rotor shaft to a consumer;
- a disconnect clutch according to an embodiment of the above description. The disconnect clutch is arranged between the rotor shaft and the internal combustion engine shaft, and the internal combustion engine can be started by the electric drive machine via the disconnect clutch.

The hybrid drive train proposed here includes a disconnect clutch in one embodiment according to the above description, the output side being connected to a consumer by means of a transmission, such that a torque from the disconnect clutch, be it from the electric drive machine or from the internal combustion engine, can be transmitted to at least one consumer by means of the transmission. The electric drive machine and the disconnect clutch may form a premountable assembly, which can be referred to as a hybrid module. The electric drive machine may be a coaxial or parallel motor generator. The rotor shaft and the internal combustion engine shaft can be connected in a switchable manner by means of the disconnect clutch, for example to start the internal combustion engine. The disconnect clutch or the main clutch can be connected with slippage in an easily adjustable manner by means of the rotary brake so that the internal combustion engine can be connected smoothly.

The disconnect clutch can be accommodated in an installation space which is conventionally provided for such a disconnect clutch. It should be noted at this point that, in one embodiment, the rotor shaft is formed in one piece by a corotating clutch cover, and the clutch cover may include a hub, for example a spline, for connecting a transmission input shaft. Alternatively, the rotor shaft is formed by a central shaft and the internal combustion engine shaft is permanently connected to the clutch cover so as to transmit torque. The central shaft is then configured for connection to a transmission input shaft.

The transmission includes, for example, a transmission gear so that the required speed or the desired torque can be adjusted automatically or manually. In an example embodiment, the transmission gearing is a continuously variable transmission (CVT), for example with a traction device or with a push belt.

According to a further aspect, a motor vehicle is proposed, having

- at least one drive wheel for propelling the motor vehicle and
- a hybrid drive train according to an embodiment of the above description, wherein the at least one propulsion wheel can be controllably supplied with a torque for propelling the motor vehicle by means of the hybrid drive train.

The axial and/or radial installation space is small in hybridized motor vehicles due to the large number of drive components and it is therefore desirable to use a small-sized hybrid drive train. This can be achieved in that the disconnect clutch can be designed with a small installation space in relation to the maximum torque that can be transmitted. At the same time, with the disconnect clutch proposed here, adjustability of slipping operation of the main clutch is provided immediately after the friction stack has been engaged.

This installation space problem is exacerbated in the case of passenger cars in the small car category according to the European classification. The assemblies used in a passenger car of the small car category are not significantly reduced in size relative to passenger cars of larger car categories.

Nevertheless, the available installation space for small cars is considerably smaller. In the (hybridized) motor vehicle proposed here with the hybrid drive train described above, in spite of the gain in functionality, no additional installation space may be required.

Passenger cars are assigned to a vehicle category according to, for example, size, price, weight and performance, wherein this definition is subject to constant change based on the needs of the market. In the US market, vehicles in the small car and microcar categories are assigned to the subcompact car category according to European classification, while in the British market they correspond to the super-mini car and city car categories respectively. Examples of the microcar category are a Volkswagen up! or a Renault Twingo. Examples of the small car category are an Alfa Romeo MiTo, Volkswagen Polo, Ford Ka+ or Renault Clio. Well-known full hybrids in the small car category are the BMW i3 or Toyota Yaris Hybrid.

According to a further aspect, a closing method for controlled closing of the disconnect clutch according to an embodiment of the above description is proposed, the closing method including at least the following steps:

a. closing the rotary brake so that a relative rotation between the armature side and the bearing side of the torque/axial force converter is brought about and thus an axial movement of the torque/axial force converter;

b. supplying power to the magnetic clutch to generate the magnetic force, e.g., after the axial gap has been completely closed by means of the rotary brake according to step a.;

c. after step b., opening the rotary brake and holding the armature on the stator by means of the magnetic force, wherein the magnetic force may be adjusted between a purely holding minimum force and a maximum force corresponding to the target torque in such a way that the main clutch can be operated with slippage.

Here, a closing method for a disconnect clutch with a magnetic clutch as a pilot clutch is proposed, the magnetic clutch including a rotary brake. In one step a., for example to start the internal combustion engine by means of the (rotating) electric drive machine, the rotary brake is closed so that a relative rotation between the armature side and the bearing side of the torque/axial force converter is brought about, and thus such an axial movement is imposed on the torque/axial force converter against its antagonistic force for holding the (maximum) axial gap between the armature and the stator that the axial gap is thus reduced until it is completely closed, for example. As a result, the axial gap can be closed without or with less (merely assisting) magnetic force. It is not necessary to generate a high or even the maximum force, or even a short-term maximum force above a continuous load capacity, by means of the coil of the magnetic clutch in order to close the axial gap (magnetically). Rather, the axial gap can be completely closed (e.g., solely) by means of the braking torque of the brake.

The magnetic clutch or its coil in step b., e.g., only after the axial gap has been completely closed according to step a., is supplied with power. As soon as the magnetic force generated in this way is sufficient to keep the axial gap closed, i.e., to keep the armature axially on the stator, with c. the brake can be disconnected again, i.e., it can be opened. It is now possible (in an optional step d.) to further increase the power supply to the coil of the magnetic clutch and thus to increase the pilot torque and thus in turn the actuation force on the friction stack, this being proportional to the current flow in the coil of the magnetic clutch, for example.

This enables slipping operation of the main clutch (at any time when the axial gap is closed).

BRIEF DESCRIPTION OF THE DRAWINGS

The disclosure described above is explained in detail below based on the relevant technical background with reference to the associated drawings, which show example embodiments. The disclosure is in no way restricted by the purely schematic drawings, wherein it should be noted that the drawings are not dimensionally accurate and are not suitable for defining proportions. In the figures.

DETAILED DESCRIPTION

Figure 1:
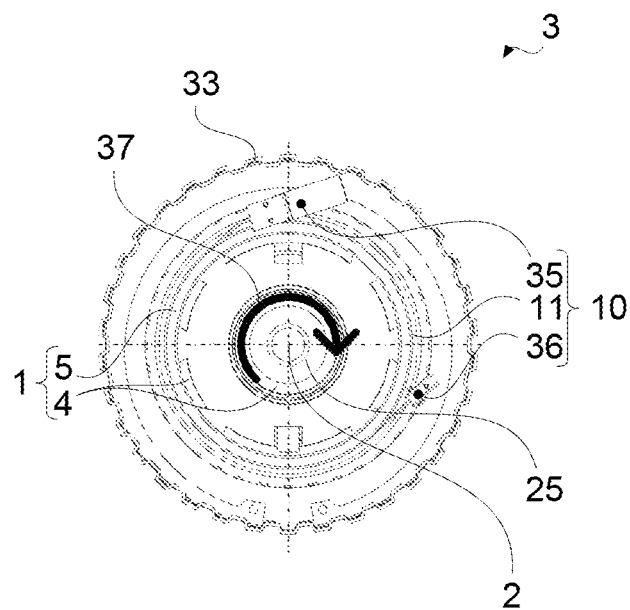
FIG. 1 shows a first embodiment of a disconnect clutch with an activated brake in a view from the connection side of an internal combustion engine.
Figure 2:
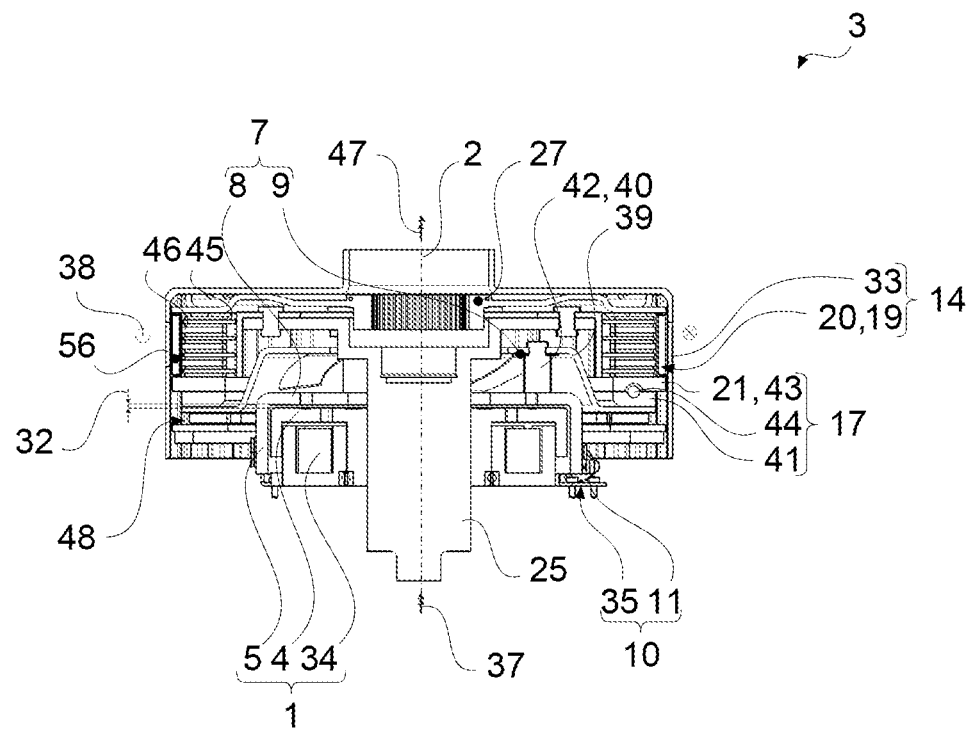
FIG. 2 shows a full section of the disconnect clutch according to FIG. 1 with deactivated brake and open magnetic clutch.
Figure 3:
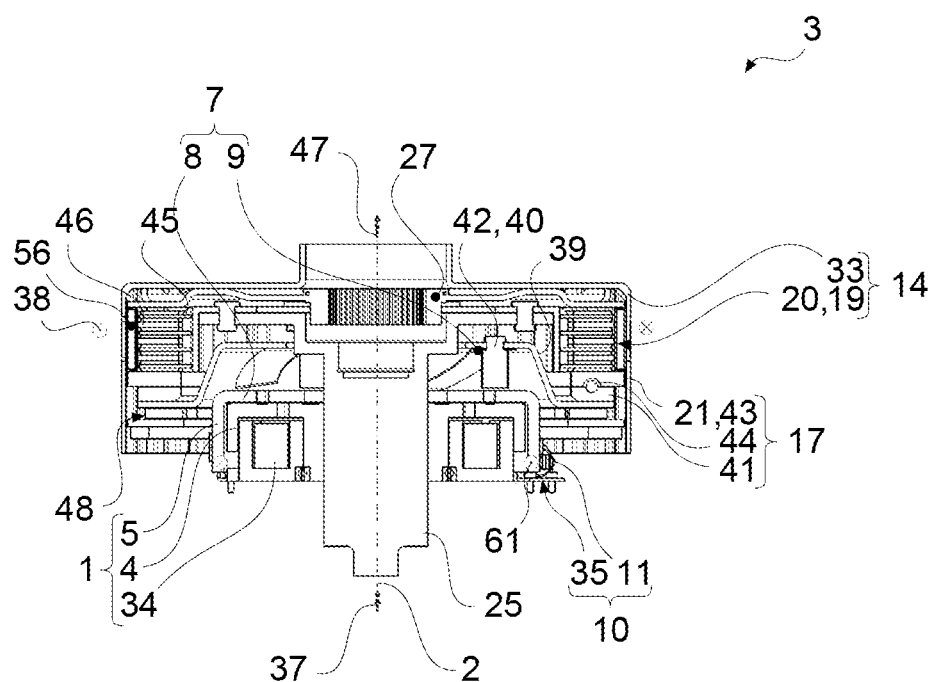
FIG. 3 shows a full section of the disconnect clutch according to FIG. 1 with the brake closed and the axial gap closed.
Figure 4:
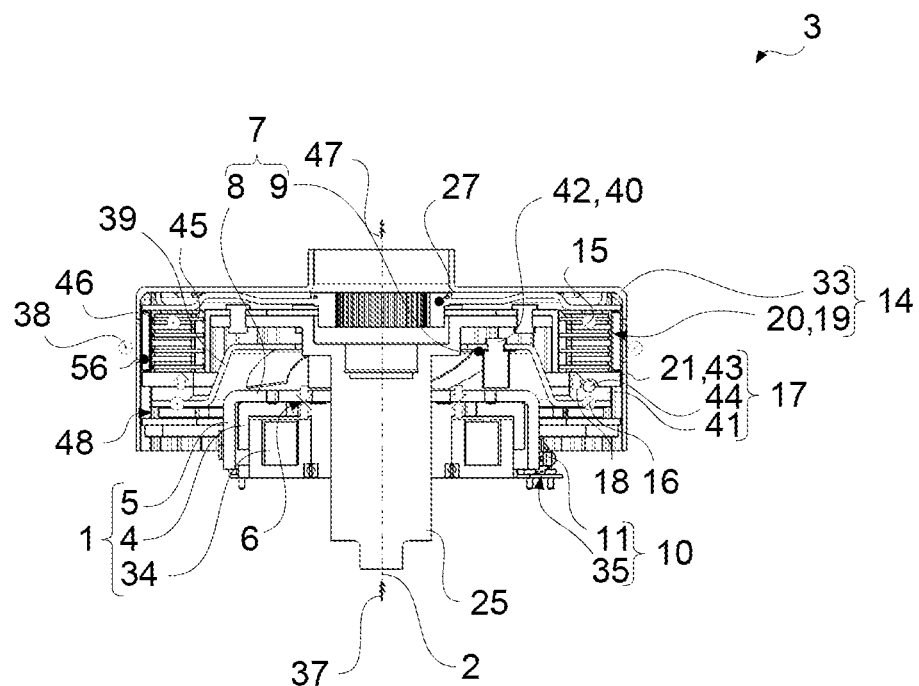
FIG. 4 shows a full section of the disconnect clutch according to FIG. 1 with the brake open and the magnetic clutch closed.
Figure 12:
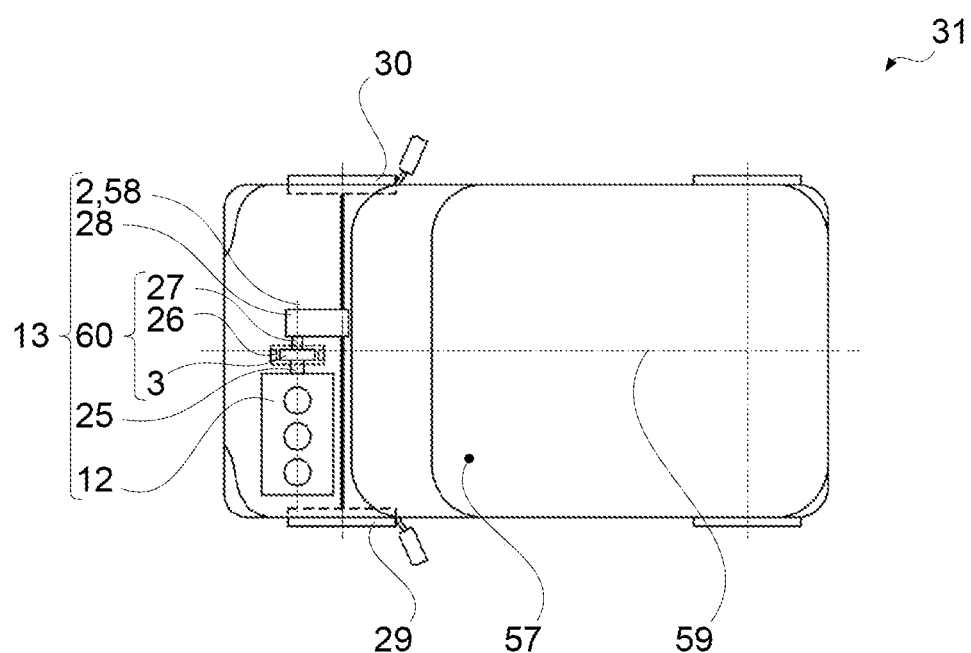
FIG. 12 shows a motor vehicle with a hybrid drive train.

FIG. 1 shows a first embodiment of the disconnect clutch 3 in a view from the connection side of an internal combustion engine 12 (not shown here, compare FIG. 12). This embodiment is shown in FIGS. 2 to 4 in a side sectional view in three different states. The disconnect clutch 3 has a corotating clutch cover 33 and is oriented coaxially with respect to an axis of rotation 2. An armature 5, a stator 4 and a solenoid 34 (compare FIG. 2) are components of a magnetic clutch 1. The stator 4 is torque-transmittingly, here frictionally, connected to the internal combustion engine shaft 25. A brake actuation actuator 35, a looped belt 11 and a looped belt attachment 36 are part of a rotary brake 10.

The illustration shows the rotary brake 10 in an activated state, wherein the looped belt 11 here (optionally) acts directly on the armature 5 and thus brakes the armature side 8 relative to the bearing side 9 of the torque/axial force converter 7 (see FIGS. 2 to 4) brakes. The looped belt 11 is fixed at one end by means of the looped belt attachment 36, for example on a stationary housing (not shown), and is here guided (optionally) about one and a half times [1.5 times] around the armature 5. At the other end, the brake actuation actuator 35 is arranged, e.g., in an electrically actuatable manner, here as a retracting and extending cylinder. When the brake 10 is activated, the cylinder is retracted (approximately to the right as shown here in the drawing); when the brake 10 is deactivated, the cylinder is extended. The travel for such a brake actuation actuator 35 is short in relation to the braking power. The necessary actuator forces are low. This enables the axial gap 32 to be closed with little energy. The functional relationship with the torque/axial force converter 7 is explained below.

In FIG. 2, the embodiment of the disconnect clutch 3 according to FIG. 1 is shown in a sectional view, the rotary brake 10 being open and the magnetic clutch 1 being deactivated. It should be noted that, for the sake of clarity, some torques are not shown below with a conventional double arrow, but by means of a pair of arrows, which each point in a common (here horizontal) plane, once out of the plane of the page and once into the plane of the page. Only one of the two arrows is marked with a reference sign.

In the illustration above, a main clutch 14 is initially arranged, which here has a friction stack 19 designed as a plate stack 20. In this (deactivated) state, the magnetic clutch 1 has an axial gap 32 between the stator 4 and armature 5. Thus, an internal combustion engine torque 37 which can be transmitted by means of the internal combustion engine shaft 25 (here, for example, an intermediate shaft between a dual-mass flywheel and the disconnect clutch input) is separated from a transmission to the rotor shaft 27 (free of drag torque). A rotor torque 38, proceeding from an electric drive machine 26 (see FIG. 12), can be permanently transmitted to the rotor shaft 27 by means of a corotating clutch cover 33, which in the embodiment shown in FIGS. 1 to 4 also forms the rotor carrier. In one embodiment, a further clutch is interposed between the rotor shaft 27 and a transmission input shaft (not shown here).

The magnetic clutch 1 is (optionally) arranged here on the internal combustion engine shaft 25. The stator 4 can be magnetized by means of an axially (and here optionally rotationally) fixed solenoid 34 when supplied with power and corotates with the internal combustion engine shaft 25. The armature 5 is connected by means of a torque/axial force converter 7 with its armature side 8 (not shown here in section), here configured as axial tension springs by means of a plurality of leaf springs, via its bearing side 9 to a leaf spring cup 39 by means of a leaf spring rivet 40 corotating with the ramp system 17 or its second ramp ring 41 (bottom in the drawing). The leaf spring rivet 40 is (optionally) also configured as a spacer pin rivet 42 and thus the axial gap 32 between the armature 5 and the stator 4 is securely adjusted. The rotary brake 10 is arranged to act directly on the armature 5.

The ramp system 17 includes a first (here upper in the drawing) ramp ring 43, the second ramp ring 41 and (optionally here) a plurality of roller bodies 44 between the two ramp rings 43, 41. The first ramp ring 43 is suspended in the corotating clutch cover 33 so as to transmit torque and here (optionally) at the same time forms the pressing means 21 for the main clutch 14 by the first ramp ring 43 being arranged directly with an inner plate 45 (here the top part is indicated pars pro toto in the drawing) of the friction stack 19 in pressable contact for the transmission of friction torque.

As long as there is no difference in torque on the second ramp ring 41 (for example the rotor torque 38 versus the internal combustion engine torque 37), the first ramp ring 43 and the second ramp ring 41 rotate synchronously. This is ensured here by means of a clamping spring 56 (designed as a helical compression spring, for example), which here (optionally) is also configured to separate the friction stack 19 (that is to space the plates 46, 45). No axial actuation force 18 is thus generated on the friction stack 19 of the main clutch 14 (see FIG. 4). The armature 5 thus rotates synchronously with the corotating clutch cover 33.

During purely electrical operation, the main clutch 14 is not pressed and only the outer plates 46 (here the top part is indicated pars pro toto in the drawing) of the friction stack 19 of the main clutch 14, the ramp system 17 and the armature 5 (held at a distance from the stator 4) are corotated. The internal combustion engine shaft 25 is decoupled and the internal combustion engine torque 37 cannot be transmitted to the rotor shaft 27 and vice versa. The transmission torque 47 therefore corresponds (in an ideally simplified view) to the rotor torque 38.

In the (deactivated) state shown here, the rotary brake 10 is open (brake actuation actuator 35 extended), and thus the looped belt 11 does not form any, at least any force-transmitting, contact with the armature 5. In the embodiment shown, the leaf spring cup 39 is (optionally) supported axially on the corotating clutch cover 33 by means of an axial bearing 48, here designed as a needle bearing or cylindrical roller bearing.

In FIG. 3, the embodiment of the disconnect clutch 3 according to FIG. 2 is shown in the same sectional view, the rotary brake 10 being closed and the axial gap 32 (see FIG. 2) being closed. The magnetic clutch 1 is, for example, deactivated, that is not supplied with power. In this (braked) state, a braking torque 61 (braking of the armature 5 towards a standstill, i.e., independent of the direction of rotation) counter to the rotor torque 38 is applied to the armature 5, owing to the braking action (by means of the braking torque 61) of the looped belt 11 rubbing on it compared to the leaf spring cup 39, and thus to the first ramp ring 43 of the ramp system 17. This has the effect that owing to the torque difference between the armature side 8 (not shown here in section) and the bearing side 9, the torque/axial force converter 7 is positioned axially and thus reduces the axial gap 32 (to zero, as shown here).

For this purpose, no magnetic force 6 may be required. Rather, it is possible to run up the power supply to the magnetic clutch 1 only at this point in time, instead of the maximum power supply already being applied, solely in order to close the axial gap 32. As a result, adjustability of the main clutch 14 is achieved. Namely, the power supply to the magnetic clutch 1 can be adjusted according to a desired engagement curve, e.g., with an engagement path and/or pressing force proportional to the flow of current, and does not already generate a maximum force, which in the previously known embodiments cannot readily be reduced again in time due to inertia (induction).

In FIG. 4, the embodiment of the disconnect clutch 3 according to FIG. 2 and FIG. 3 is shown in the same sectional view, the rotary brake 10 being open again and the axial gap 32 (see FIG. 2) being closed solely by means of the magnetic force 6 of the now activated, i.e., powered, magnetic clutch 1. In this (activated) state, the rotary brake 10 is (again) open and no braking action is exerted on the armature 5. The ramp system 17 is fully actuatable by means of the magnetic force 6 and can be adjusted from a minimum actuation force 18 to a maximum actuation force 18 on the friction stack 19 for a smooth synchronization of the internal combustion engine shaft 25 with respect to the rotor shaft 27 up to a transferability of a target torque 15. The transmission torque 47 now corresponds to the sum of the total rotor torque 38 and the internal combustion engine torque 37 in each case. Of course, the rotor torque 38 can be reduced to zero here or can even be operated in a recuperation mode with an opposing rotor torque 38.

Figure 5:
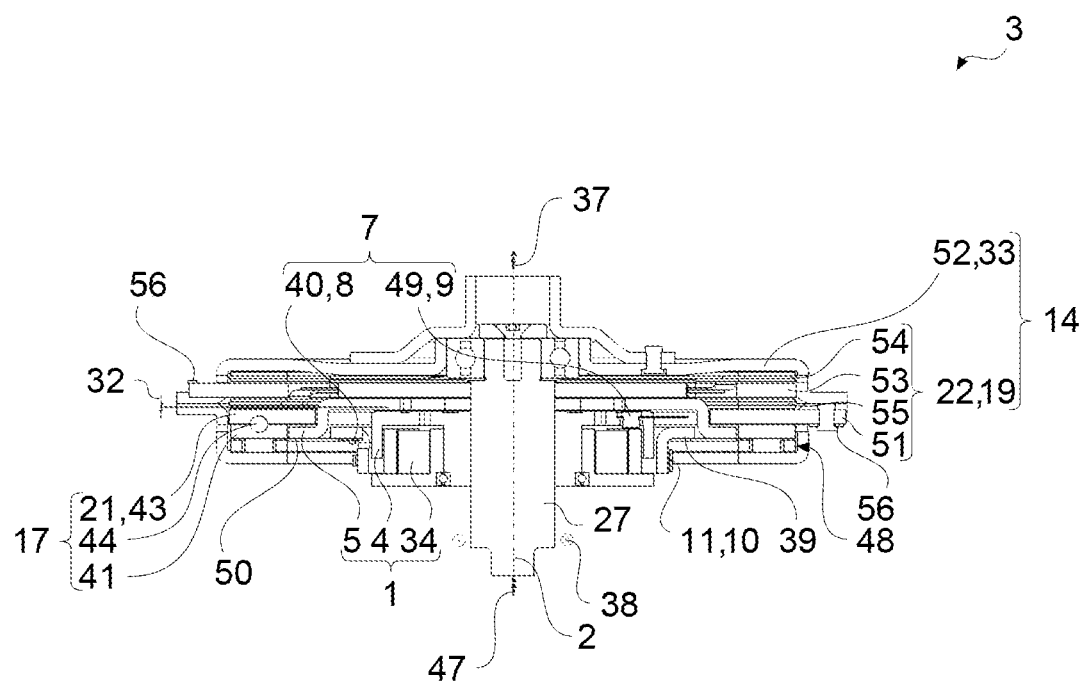
FIG. 5 shows a full section of the disconnect clutch in a second embodiment in the deactivated state according to FIG. 2.

In FIG. 5, a second embodiment of the disconnect clutch 3 is shown in the same sectional view as in FIG. 2. Here the central shaft is the rotor shaft 27 and (as shown) the connection for an internal combustion engine shaft 25 (see FIG. 12) is formed at the top. This second embodiment of the disconnect clutch 3 is similar in terms of the torque transmission operating principle to that of the first embodiment of the disconnect clutch 3 according to FIGS. 1 to 4. In this respect, reference is made to the preceding description of FIGS. 2 to 4.

In this second embodiment, the rotor torque 38 can be transmitted from the rotor shaft 27 directly, here (optionally) frictionally, to the stator 4. The stator 4 is connected in a torque-transmitting manner to the leaf spring cup 39 by means of the torque/axial force converter 7, here (optionally) configured as a compression spring device with a plurality of leaf springs. The leaf spring cup 39 is fixed to the stator 4 by means of a first leaf spring rivet 40 on the armature side 8 and by means of a second leaf spring rivet 49 on the bearing side 9. The leaf spring cup 39 again in the state shown is arranged axially offset with respect to the armature 5 such that a switching disk 50 which is axially fixed to the armature 5 holds the armature 5 spaced apart from the stator 4 with the axial gap 32. The armature 5 is (also compare FIGS. 6 and 7) is connected here (optionally) by means of a toothing to the second ramp ring 41 so as to be axially movable relative to the second ramp ring 41. The looped belt 11 is wound directly around the leaf spring cup 39.

The friction stack 19 of the main clutch 14 is designed here as a multi-disk stack 22, the first ramp ring 43 as a pressure plate 51 forming the pressing means 21 and the corotating clutch cover 33 forming the counter-plate 52. An intermediate plate 53 is arranged axially centrally between a first friction plate 54 and a second friction disk 55 so that the two friction plates 54, 55 can be pressed by means of the ramp system 17 between the plates 51, 52, 53. The armature 5 is connected, here optionally interlockingly, directly to the second ramp ring 41 of the ramp system 17 in a torque-transmitting manner.

Figure 6:
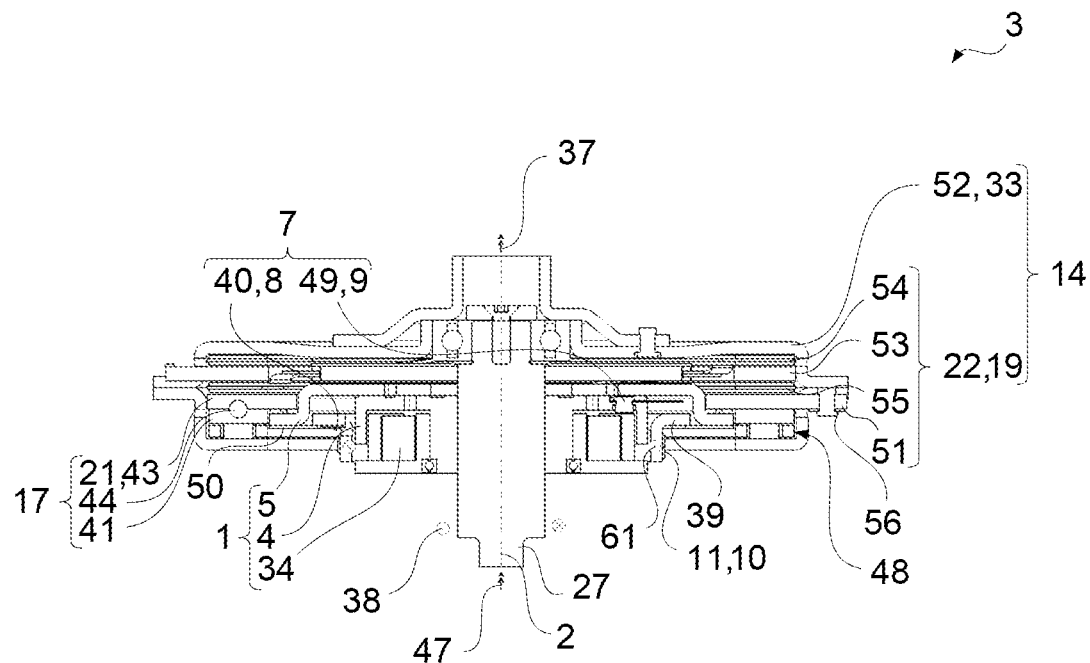
FIG. 6 shows a full section of the disconnect clutch according to FIG. 5 in the braked state according to FIG. 3.

In FIG. 6, the disconnect clutch 3 according to FIG. 5 is shown in the braked state according to FIG. 3. The frictional braking (braking torque 61) of the leaf spring cup 39 originating from the looped belt 11 creates a torque difference between the stator 4 and the braked leaf spring cup 39, such that the torque/axial force converter 7 contracts axially and thus presses the armature 5 against the stator 4 in a controlled manner by means of the switching disk 50 and eliminates the axial gap 32 (see FIG. 5).

Figure 7:
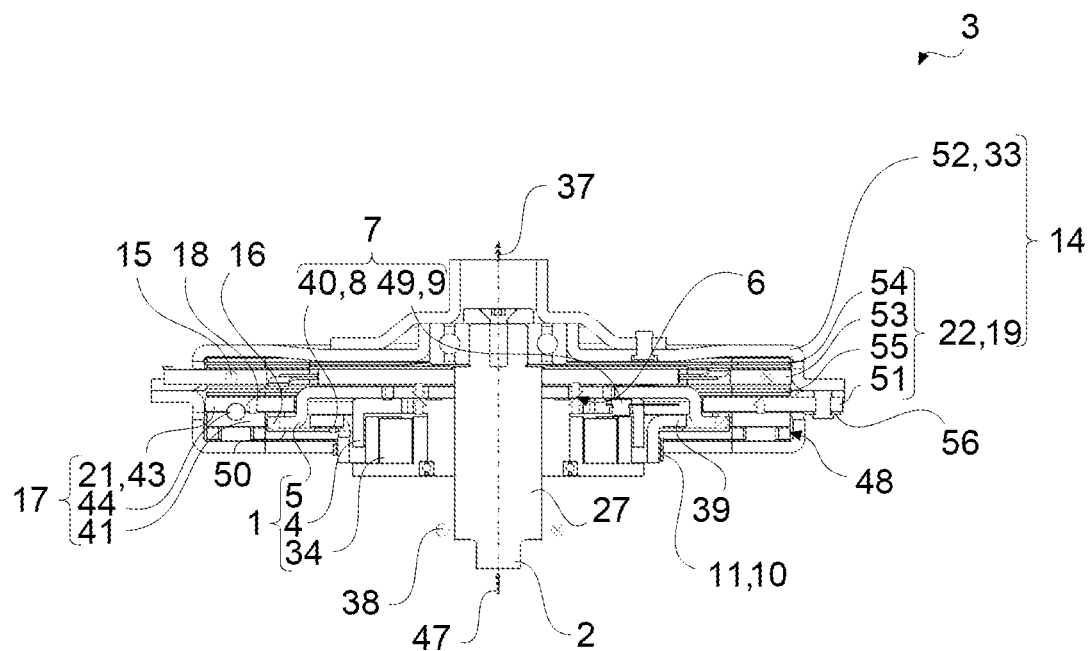
FIG. 7 shows a full section of the disconnect clutch according to FIG. 5 in the activated state according to FIG. 4.

In FIG. 7, the disconnect clutch 3 according to FIG. 5 and FIG. 6 is shown in the activated state according to FIG. 4. In this (activated) state, the rotary brake 10 is (again) open and no braking action is exerted on the armature 5. The ramp system 17 can now be fully actuated by means of the magnetic force 6.

Figure 8:
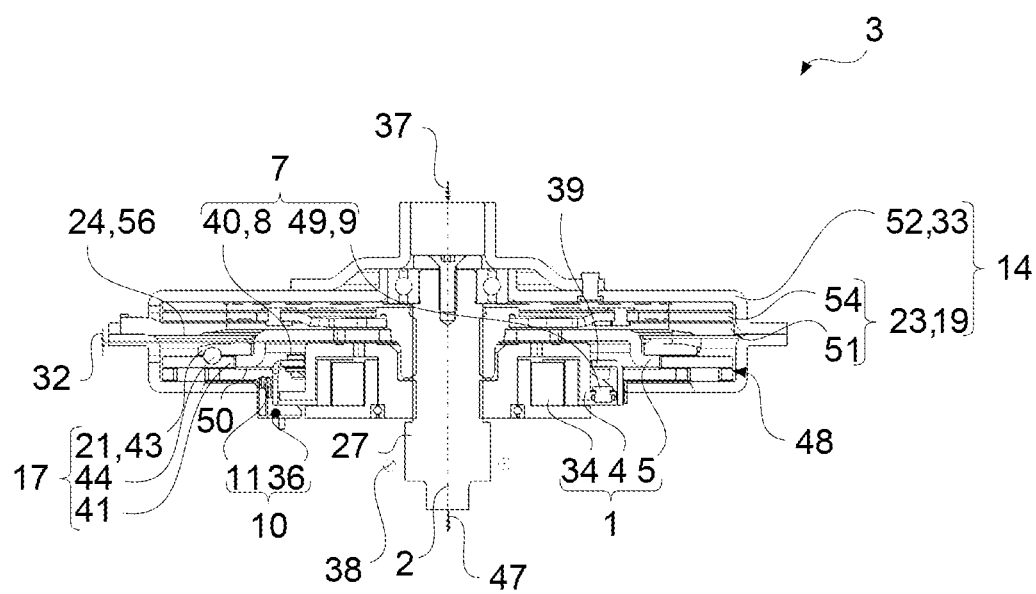
FIG. 8 shows a full section of the disconnect clutch in a third embodiment in the deactivated state according to FIG. 2.

In FIG. 8, a third embodiment of the disconnect clutch 3 is shown in the same sectional view as in FIGS. 2 and 5. Here the central shaft is the rotor shaft 27 and (as shown) the connection for an internal combustion engine shaft 25 (see FIG. 12) is formed at the top. This third embodiment of the disconnect clutch 3 is similar in terms of torque transmission operating principle to that of the second embodiment of the disconnect clutch 3 according to FIGS. 5 to 7. In this respect, reference is made to the preceding description of FIGS. 2 to 4 and FIGS. 5 to 7.

In this third embodiment, the rotor torque 38 can be transmitted from the rotor shaft 27 directly, here (optionally) frictionally, to the stator 4. The stator 4 is connected in a torque-transmitting manner to the leaf spring cup 39 by means of the torque/axial force converter 7, here (optionally) configured as a compression spring device with a plurality of leaf springs. The leaf spring cup 39 is fixed by means of a first leaf spring rivet 40 on the armature side 8 to the leaf spring cup 39 and by means of a second leaf spring rivet 49 on the bearing side 9 to the stator 4. The leaf spring cup 39 again in the state shown is arranged axially offset with respect to the armature 5 such that a switching disk 50 which is axially fixed to the armature 5 holds the armature 5 spaced apart from the stator 4 with the axial gap 32. The armature 5 is (also compare FIGS. 9 and 10) connected here (optionally) by means of a toothing to the second ramp ring 41 so as to be axially movable relative to the second ramp ring 41. The looped belt 11 is wound directly around the leaf spring cup 39.

The friction stack 19 of the main clutch 14 is designed here as a single-disk stack 23, the first ramp ring 43 by means of an actuating spring 24, for example a so-called lever spring, forming a (separate) pressure plate 51 and the corotating clutch cover 33 forming the counter-plate 52. A (first and only) friction disk 54 is arranged axially centrally so that the friction disk 54 can be pressed between the plates 51, 52 by means of the ramp system 17. The armature 5 is connected, here optionally interlockingly, directly to the second ramp ring 41 of the ramp system 17 in a torque-transmitting manner. The looped belt attachment 36 can be seen here.

Figure 9:
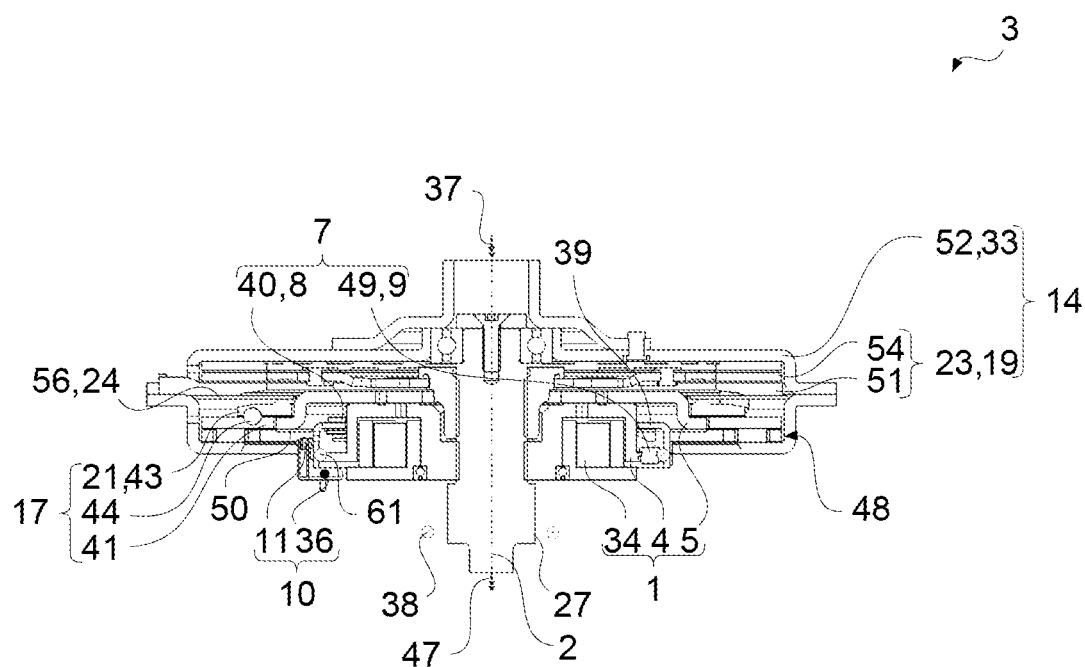
FIG. 9 shows a full section of the disconnect clutch according to FIG. 8 in the braked state according to FIG. 3.

In FIG. 9, the disconnect clutch 3 according to FIG. 8 is shown in the braked state according to FIG. 6. The frictional braking (braking torque 61) of the leaf spring cup 39 originating from the looped belt 11 creates a torque difference between the stator 4 and the braked leaf spring cup 39, such that the torque/axial force converter 7 contracts axially and thus presses the armature 5 against the stator 4 in a controlled manner by means of the switching disk 50 and eliminates the axial gap 32 (see FIG. 8).

Figure 10:
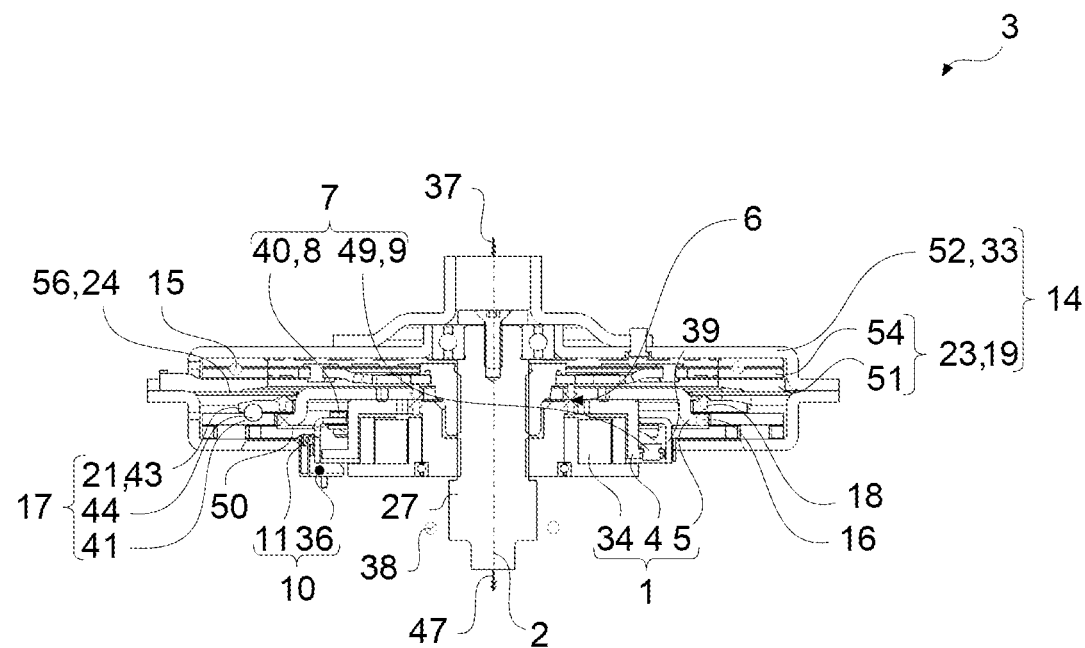
FIG. 10 shows a full section of the disconnect clutch according to FIG. 5 in the activated state according to FIG. 4.

In FIG. 10, the disconnect clutch 3 according to FIG. 8 and FIG. 9 is shown in the activated state according to FIG. 7. In this (activated) state, the rotary brake 10 is (again) open and no braking action is exerted on the armature 5. The ramp system 17 can now be fully actuated by means of the magnetic force 6.

Figure 11:
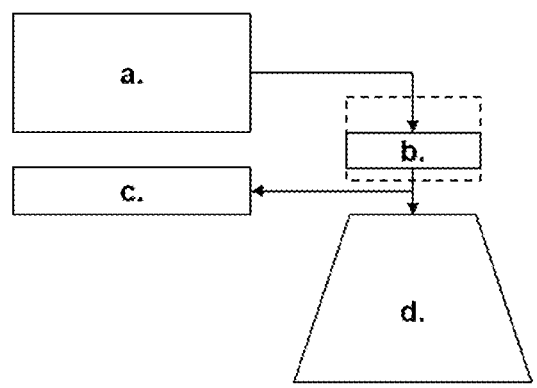
FIG. 11 shows a flow diagram of an embodiment of a closing method.

FIG. 11 shows a flow diagram for an embodiment of a closing method executed with a disconnect clutch 3, as shown for example in the preceding figures. In one step a. the rotary brake 10 is closed so that, by means of a braking torque 61, a relative rotation between the armature side 8 and the bearing side 9 of the torque/axial force converter 7 and thus an axial movement of the torque/axial force converter 7 are brought about and thus the axial gap 32 is closed.

In a step b., the magnetic clutch 1 or the coil for generating the magnetic force 6 is supplied (with power). This actuation of the magnetic clutch 1 may be carried out only after a complete closing of the axial gap 32 by means of the rotary brake 10 according to step a, for example. Alternatively, step b. (shown with a dashed line) earlier, i.e., overlapping with step a., is carried out to support the closing process of the axial gap 32.

As soon as a sufficient magnetic force 6 is generated to hold the armature 5 on the stator 4, in step c. the rotary brake 10 is opened and the armature 5 is held on the stator 4 solely by means of the magnetic force 6. The axial gap 32 may be already completely closed when step c. is carried out. Alternatively, a remaining (axial) distance is closed solely by the magnetic force 6.

In a subsequent step d., the power supply is (optionally) increased in order to smoothly increase the pressing force by means of the ramp system 17. In this case, the magnetic force 6 in step b. is not yet large enough to transmit the desired target torque 15, e.g., not yet large enough to transmit a sufficient pilot torque 16 to the ramp system 17 to overcome the counterforce of the clamping spring 56 so that then no drag torque or a drag torque that is negligible in the hybrid drive train 13 can be transmitted to the internal combustion engine shaft 25 (see FIG. 12).

FIG. 12 shows a motor vehicle 31 with a hybrid drive train 13 (optionally in front of the driver's cab 57 and optionally in a transverse arrangement, that is with the engine axis 58 transverse to the longitudinal axis 59 of the motor vehicle 31) a schematic view from above. Here the front axle, and thus the left drive wheel 29 and the second drive wheel 30, is driven by the hybrid drive train 13. The rear axle is designed to run concurrently or also (all-wheel drive) or alternatively driven by the hybrid drive train 13. The hybrid drive train 13 comprises an internal combustion engine 12 and an electric drive machine 26, wherein here (optionally) the electric drive machine 26 is integrated in a hybrid module 60. Both drive machines 26, 12 are connected to the drive wheels 29, 30 in a torque-transmitting manner by means of a transmission 28, for example a belt-drive transmission. In this embodiment, the internal combustion engine shaft 25 is detachably connected to the transmission 28 by means of the rotor shaft 27 of the electric drive machine 26 by means of the disconnect clutch 3 (contained here in the hybrid module 60).

With the magnetic clutch proposed here, a pilot clutch for a disconnect clutch is provided which has an adjustable travel.

REFERENCE NUMERALS

1 Magnetic clutch
2 Axis of rotation
3 Disconnect clutch
4 Stator
5 Armature
6 Magnetic force
7 Torque/axial force converter
8 Armature side
9 Bearing side
10 Rotary brake
11 Looped belt
12 Internal combustion engine
13 Hybrid drive train
14 Main clutch
15 Target torque
16 Pilot torque
17 Ramp system
18 Actuation force
19 Friction stack
20 Plate stack
21 Pressing means
22 Multi-disk stack
23 Single-disk stack
24 Actuating spring
25 Internal combustion engine shaft
26 Electric drive machine
27 Rotor shaft
28 Transmission
29 Left drive wheel
30 Right drive wheel
31 Motor vehicle
32 Axial gap
33 Corotating clutch cover
34 Solenoid
35 Brake actuation actuator
36 Looped belt attachment
37 Internal combustion engine torque
38 Rotor torque
39 Leaf spring cup
40 First leaf spring rivet
41 Second ramp ring
42 Spacer pin rivet
43 First ramp ring
44 Roller body
45 Inner plate
46 Outer plate
47 Transmission torque
48 Axial bearing
49 Second leaf spring rivet
50 Switching disk
51 Pressure plate
52 Counter-plate
53 Intermediate plate
54 (First) friction disk
55 Second friction disk
56 Clamping spring
57 Driver's cab
58 Motor axis
59 Longitudinal axis
60 Hybrid module
61 Braking torque

The invention claimed is:

1. A magnetic clutch for actuating a disconnect clutch, comprising:
   an axis of rotation;
   an axially fixed stator;
   an axially movable armature, axially retainable on the stator by a magnetic force from a power supply;
   a torque-axial force converter unit comprising:
      an armature side; and
      a bearing side, the torque-axial force converter unit acting opposed to the magnetic force to hold the armature at an axial distance from the stator; and
   a rotary brake for effecting a rotational speed difference between the armature side and the bearing side.

2. The magnetic clutch of claim 1, wherein the rotary brake comprises a looped belt.

3. The magnetic clutch of claim 2 wherein the looped belt is frictionally connectable directly to the armature in a torque-transmitting manner.

4. A disconnect clutch for an internal combustion engine in a hybrid drive train, comprising:
   a main clutch for separable transmission of a predetermined target torque;
   the magnetic clutch of claim 1 for controllable transmission of a pilot torque for the main clutch; and
   a ramp system for converting the pilot torque into an axial actuation force, wherein the main clutch is closable by means of the axial actuation force.

5. The disconnect clutch of claim 4, wherein the main clutch comprises a friction stack designed as a plate stack.

6. The disconnect clutch of claim 5 wherein the ramp system is a pressing means acting directly on the plate stack.

7. The disconnect clutch of claim 4, wherein the main clutch comprises a friction stack designed as a multi-disk stack.

8. The disconnect clutch of claim 7 wherein the ramp system is a pressing means acting directly on the multi-disk stack.

9. The disconnect clutch of claim 4, wherein the main clutch comprises a friction stack designed as a single-disk stack.

10. The disconnect clutch of claim 9 further comprising an actuating spring arranged between the ramp system and the single-disk stack.

11. A hybrid drive train, comprising:
- an internal combustion engine comprising an internal combustion engine shaft;
- an electric drive machine comprising a rotor shaft;
- a transmission for transmitting a torque from the internal combustion engine shaft or the rotor shaft to a drive wheel; and
- the disconnect clutch of claim 4 arranged between the rotor shaft and the internal combustion engine shaft, wherein the internal combustion engine can be started by the electric drive machine via the disconnect clutch.

12. A motor vehicle, comprising:
- a drive wheel for propelling the motor vehicle; and
- the hybrid drive train of claim 11 arranged to supply the torque to the drive wheel to propel the motor vehicle.

13. A method for controlled closing of the disconnect clutch of claim 4, comprising:
- closing the rotary brake to effect a relative rotation between the armature side and the bearing side and an axial movement of the torque-axial force converter unit;
- supplying power to the magnetic clutch to generate the magnetic force; and
- opening the rotary brake and holding the armature on the stator with the magnetic force.

14. The method of claim 13 wherein the step of supplying power to the magnetic clutch is started after an axial gap between the armature and the stator has been completely closed by the axial movement of the torque-axial force converter unit.

15. The method of claim 13, wherein the magnetic force can be adjusted between a purely holding minimum force and a maximum force corresponding to the predetermined target torque to operate the main clutch with slippage.

* * * * *